US008735844B1

(12) United States Patent
Khaykovich et al.

(10) Patent No.: US 8,735,844 B1
(45) Date of Patent: May 27, 2014

(54) COMPACT NEUTRON IMAGING SYSTEM USING AXISYMMETRIC MIRRORS

(71) Applicants: Massachusetts Institute of Technology, Cambridge, MA (US); The United States of America as Represented by the Administrator of the National Aeronautics and Space Adm, Washington, DC (US)

(72) Inventors: Boris Khaykovich, Brookline, MA (US); David E. Moncton, Newton, MA (US); Mikhail V. Gubarev, Huntsville, AL (US); Brian D. Ramsey, Huntsville, MA (US); Darell E. Engelhaupt, Madison, AL (US)

(73) Assignees: Massachusetts Institute of Technology, Cambridge, MA (US); The United States of America as Represented by the Administrator of the National Aeronautics and Space Administration, Washington, DC (US); The University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 13/832,778

(22) Filed: Mar. 15, 2013

Related U.S. Application Data

(60) Provisional application No. 61/615,500, filed on Mar. 26, 2012.

(51) Int. Cl.
*G01T 3/00* (2006.01)

(52) U.S. Cl.
USPC .......................................................... 250/390.1

(58) Field of Classification Search
USPC ........... 250/390.1, 503.1, 505.1; 205/71, 103, 205/107
See application file for complete search history.

(56) References Cited

U.S. PATENT DOCUMENTS

| | | | | |
|---|---|---|---|---|
| 7,425,255 | B2 * | 9/2008 | Detor et al. | 205/81 |
| 8,309,944 | B1 * | 11/2012 | Gubarev et al. | 250/504 R |
| 2007/0114470 | A1 * | 5/2007 | Bowering | 250/504 R |

OTHER PUBLICATIONS

D. Liu, et al., "Demonstration of achromatic cold-neutron microscope utilizing axisymmetric focusing mirrors", 102 Appl. Phys. Lett. 183508 (May 2013).

Boris Khaykovich, et al., "From x-ray telescopes to neutron scattering: using axisymmetric mirrors to focus a neutron beam", Nuclear Instr. and Meth. A, 98-104 (2011).

Boris Khaykovich, et al., "On the challenge of flux concentration at grazing incidence for neutrons and x-rays", Proc. SPIE 8485, Nonimaging Optics: Efficient Design for Illumination and Solar Concentration IX, 848509 (Oct. 11, 2012).

Boris Khaykovich, et al., "Focusing Optics for Neutrons: From x-ray telescopes to Compact Neutron Sources", UCANS-II, The Second Meeting of the Union for Compact Accelerator-Driven Neutron Sources (Jul. 2011).

* cited by examiner

*Primary Examiner* — David Porta
*Assistant Examiner* — Hugh H Maupin
(74) *Attorney, Agent, or Firm* — Modern Times Legal; Robert J. Sayre

(57) ABSTRACT

A dispersed release of neutrons is generated from a source. A portion of this dispersed neutron release is reflected by surfaces of a plurality of nested, axisymmetric mirrors in at least an inner mirror layer and an outer mirror layer, wherein the neutrons reflected by the inner mirror layer are incident on at least one mirror surface of the inner mirror layer N times, wherein N is an integer, and wherein neutrons reflected by the outer mirror are incident on a plurality of mirror surfaces of the outer layer N+i times, where i is a positive integer, to redirect the neutrons toward a target. The mirrors can be formed by a periodically reversed pulsed-plating process.

20 Claims, 8 Drawing Sheets

COMPACT NEUTRON IMAGING SYSTEM USING AXISYMMETRIC MIRRORS

RELATED APPLICATION

This application claims the benefit of U.S. Provisional Application No. 61/615,500, filed 26 Mar. 2012, the entire content of which is incorporated herein by reference.

GOVERNMENT SUPPORT

This invention was made with government support under Grant No. DE-FG02-09ER46556 and DE-FG02-09ER46557 awarded by the U.S. Department of Energy, Office of Basic Energy Sciences. The Government has certain rights in the invention.

BACKGROUND

Imaging (or radiography) with thermal neutron beams is an important way of studying man-made or natural materials and structures, such as fuel cells, batteries, car engines, cultural heritage objects, etc., on a wide range of scales from atomic through mesoscopic to macroscopic. The energy spectrum of the beam is determined by the properties of a neutron moderator, which produces either cold (1-10 meV) or thermal (10-80 meV) neutrons by moderating the high-energy neutrons produced by various methods. The collimation of the beam determines the spatial resolution of the imaging instrument.

A typical set up for neutron collimation is shown schematically on FIG. 1. To create a collimated beam, a small aperture 14 of the diameter, D, is located at a distance from the neutron source 12. The collimation is characterized by the L/D ratio, where L is the aperture-to-object distance. The object 16 is placed as close as possible to the neutron detector 18. The L/D ratio would normally span a range of 300-600, but can go as high as 6,000 for high-resolution imaging. To achieve such a high L/D for a reasonable L, the neutron aperture is limited to a small diameter, thus severely restricting the flux illuminating the object 16 (i.e., D is much smaller than a typical size of thermal neutron sources, which can be as large as 200 mm). Consequently, high-resolution neutron imaging typically requires high-flux research reactors, which are not easily accessible.

Moreover, and despite recent progress with neutron sources, neutron instruments remain limited, sometimes severely, by available neutron fluxes; and this limitation is particularly acute for compact accelerator-based neutron sources. Consequently, progress in neutron optics and instrumentation provides a path toward more-effective neutron instruments that is as important as the development of brighter sources.

Relatively weak interactions of neutrons with most materials give neutron radiation its penetrating power. However, the weakness of interactions results in the refractive index, which is very close to unity for most materials, $1-n\approx10^{-6}$. Consequently, neutrons reflect from surfaces only at grazing angles, which are normally not larger than a few degrees. The refractive index depends on the square of the neutron wavelength so that refractive optics are strongly chromatic, which is a considerable disadvantage for instruments operating with polychromatic neutron beams. As a result, it is challenging to build efficient neutron optical components, such as lenses and mirrors normally used in visible-light optics. Currently, several kinds of neutron-focusing mirrors exist. Elliptical Kirkpatrick-Baez (KB) mirrors have been recently developed, following their successful use for synchrotron x-rays. KB mirrors can be precisely figured with low roughness and coated with multilayers having high a critical angle. For large neutron sources of 5-50 mm, however, such mirrors are not always optimal since they work best for sources of less than 1 mm. Furthermore, elliptical KB mirrors are not ideal as imaging devices, since the magnification of an elliptical mirror depends on an incident angle, leading to distortions in imaging of large objects. Somewhat similar toroidal mirrors are used in small-angle neutron scattering (SANS), but with limited success so far.

SUMMARY

An apparatus and a method for collecting and directing neutrons and methods for forming the mirrors used therefore are described herein. Various embodiments of the apparatus and methods may include some or all of the elements, features and steps described below.

An apparatus for collecting and directing neutrons via grazing-incidence reflection using nested, axisymmetric mirrors, includes a neutron source and a plurality of nested, axisymmetric mirror layers positioned to receive neutrons from the neutron source and to reflect the neutrons in a redirected path, wherein the mirror layers include at least an inner mirror layer and an outer mirror layer, wherein the inner mirror layer is configured to reflect neutrons from the neutron source that are incident on the inner mirror layer N times, wherein N is an integer, and wherein the outer mirror layer is configured to reflect neutrons that are incident on the outer mirror layer N+i times, where i is a positive integer.

In particular embodiments, N and i can be even numbers; and the mirrors can include inner surfaces that can be characterized as a function for a section of at least one of the following shapes: a cone, an ellipsoid, a hyperboloid, a paraboloid, and a shape characterized by a higher-degree polynomial. The mirror sections can be separated as discrete mirror structures within a layer or can be joined into unitary mirror structures. The outer mirror can have a plurality of inner surface sections, where each surface section can be defined by a function that is distinct from the functions of the other surfaces. In some embodiments, the mirrors are configured to direct neutrons from the neutron source toward a common focal point. In other embodiments, the mirrors are configured to direct neutrons from the neutron source toward a detector; and an object to be scanned can be placed between the neutron source and the detector in the path of the neutrons from the source. The inner neutron-reflection surfaces of the mirrors can include nickel, which can be substantially uniform in the mirror or included in a multi-layer coating, and can have a surface roughness less than 20 angstrom root mean square.

A method for collecting and directing neutrons includes generating a dispersed release of neutrons from a source and reflecting a portion of the dispersed released of neutrons by surfaces of a plurality of nested, axisymmetric mirror layers, including at least an inner mirror layer and an outer mirror layer, wherein neutrons reflected by the inner mirror layer are incident on at least one surface of the inner mirror layer N times, wherein N is an integer, and wherein neutrons reflected by the outer mirror layer are incident on the surfaces of the outer mirror layer N+i times, where i is a positive integer, to redirect the neutrons toward a target.

A method for forming a mirror (e.g., that can be used in the above-outlined apparatus and method) includes electroform plating a neutron-reflecting material on a substrate (e.g., a mandrel) subject to an electric current and periodically reversing the electric current to etch away a portion of the plated material that has a lower bond energy to leave a neutron-reflecting mirror with a reflecting surface formed of the remaining plated material.

In a proof-of-principle experiment, the nested mirrors were used to de-magnify a 2-mm-diameter source by a factor of four; both the source and the detector were placed at focal planes of the optics, 3.2 m apart. In ray-tracing simulations, a system with a source-object separation of 10 m was simulated for 5 meV neutrons and with mirrors coated with high-critical angle multilayers (m=3 neutron supermirror coating); the system was found to increase the neutron flux on an object 16 of 1-mm diameter by almost an order of magnitude.

Typical neutron beam experiments demand high fluxes; but, because of the diffuse nature of reactor sources, this typically necessitates the use of powerful neutron facilities which have limited accessibility. The mirror configurations described herein can remedy this problem by utilizing commercially available compact neutron sources and then using optical components to modify the available fluxes. The modification provided by the optics can be, for example, the generation of a parallel beam from a point source or the refocusing of the neutron emission to enhance the flux at a distance from the source via one or multiple consecutive reflections off the specially shaped mirrors to produce, e.g., a high-quality image. The mirrors (optics) can be used to control the emission from a compact neutron generator (e.g., an API 120 neutron generator from Thermo Scientific, which weighs less than 15 kg) in such a way as to generate a parallel beam of neutrons or to generate divergent or convergent beams. The optical elements can be concentrically nested to improve throughput; and the use of multiple reflections can divert the beam through significant angles and can, therefore, further improve throughput by increasing the solid acceptance angle of the source flux, as can the use of multilayer coatings. The nested mirrors can also operate achromatically, allowing (in contrast to refractive optics), grazing-incidence reflection at all energies below a cut-off point, providing broad-energy-band coverage.

Advantages that can be provided by embodiments of the method and apparatus include the capacity for large angular collection of neutrons via the nesting of mirrors. The output from the mirrors can also be nearly aberration-free. Additionally, by nesting the mirrors, relatively short optics can be produced that are comparable to focusing guides in flux collection capabilities. Accordingly, these systems and methods can be used as polychromatic lenses to improve the performance of small-angle-scattering, imaging, and other instruments with compact neutron sources. For example, the mirrors can produce a non-achromatic divergent, parallel or convergent beam of neutrons or a beam of a particular shape (as function of mirror shape) for a variety of applications. Moreover, increasing the collection efficiency of the mirrors while reducing distortions can lead to novel neutron instruments.

The use of replicative fabrication techniques using a mandrel permits multiple copies of the mirror components to be fabricated from a single master mandrel, thereby reducing fabrication costs. Additionally, the use of a pulsed electroform plating technique in the method for fabricating neutron mirrors, described herein, can produce mirror material having much lower internal mechanical stress, which provides the mirror with improved optical performance. Depending on the desired geometry, flux gain, etc., any number of reflections can be used to increase the acceptance angle of the system. The use of multilayer coatings can provide further enhancements.

BRIEF DESCRIPTION OF THE DRAWINGS

FIG. 18 shows flux densities at the focus of an ellipsoid mirror, while FIG. 19 shows flux densities of a paraboloid-paraboloid mirror as a function of the mirror's radius.

FIG. 23 shows the output with the background gradient removed and FIG. 21 shows the unmodified output.

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
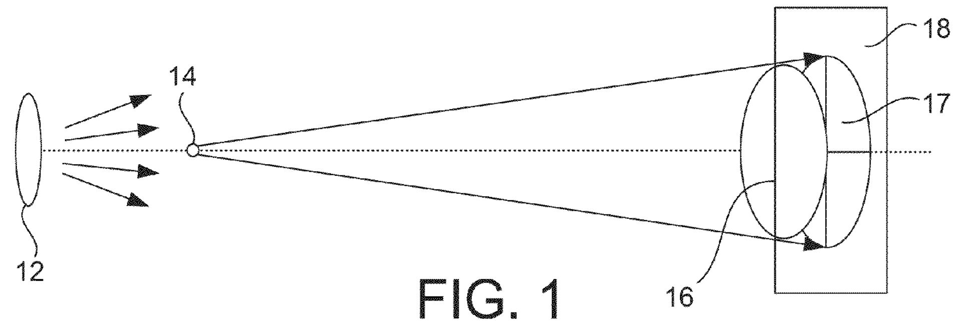
FIG. 1 illustrates a conventional approach for neutron collimation without focusing optics.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

In 1952, Hans Wolter described the advantages of axisymmetric glancing-angle mirrors for an x-ray microscope, based on the pairing of a con-focal ellipsoid and hyperboloid. A modification of this idea has found applications in x-ray astronomy, where paraboloid-hyperboloid telescope mirrors are used routinely. Additionally, the use of Wolter-type optics to focus neutron beams is discussed in U.S. Pat. No. 8,309,944 B1 (M. Gubarev, et al., "Grazing Incidence Neutron Optics"). A major benefit of using Wolter-type optics is the possibility of nesting axisymmetric mirrors with different diameters but the same focal length inside each other to enhance neutron collection efficiency. In contrast, KB or toroidal mirrors cannot be easily nested. An additional benefit is the flexibility of the optics, which can be made removable, in contrast to most neutron guides. The degree of flexibility offered by short removable mirrors can be a great asset for compact neutron sources, which often operate a small number of beam-lines.

As described herein, one can improve neutron imaging dramatically by using axisymmetric neutron-focusing grazing-incidence mirrors based on full figures of resolution, which are sometimes referred to as Wolter mirrors, to greatly increase the useful neutron flux. The grazing-incidence neutron mirrors 20, 22 (optics) are configured in relation to a compact neutron source 12 to produce a controlled beam of neutrons, which can be divergent, parallel or convergent. The neutrons are controlled using one or multiple consecutive reflections from smooth surfaces (e.g., with a surface roughness less than 5 angstrom root mean square), the figure of which is described by the equations of the second order and their approximations, as described herein. Mirrors 20, 22 of the same focal length and with a thickness, e.g., of about 1 mm can be either nested or stacked together to increase the system throughput. These optics are achromatic, so a larger portion of the source 12 spectrum can be utilized compared to other types of the neutron optics.

We have made and tested axisymmetric neutron-focusing mirrors 20, 22 at the MIT Nuclear Reactor Laboratory (as well as at Oak Ridge National Laboratory and at the National Institute of Standards and Technology) and have conducted computer simulations of the optics. The mirrors 20, 22 can be made of Ni and can have a length, e.g., of 1 m or more and can have a diameter of, e.g., 0.5 m.

Figure 2:
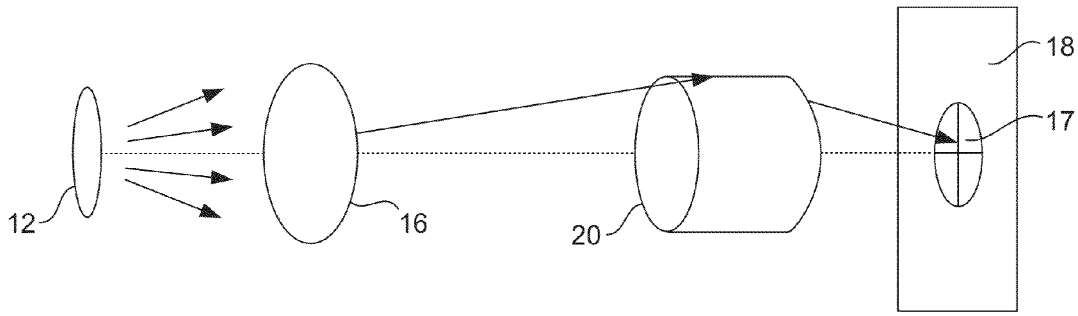
FIG. 2 illustrates an approach for neutron collimation with focusing optics.

The mirrors 20, 22 are combinations of conical sections (or higher-order polynomials), which focus neutrons at grazing-incidence angles. Only neutrons with incident angles below a certain critical angle are reflected from the surface, and they must reflect from both mirrors 20/22 before reaching the focus. By using the mirrors 20, 22 as an image-forming lens placed behind the object 16, the resolution of an imaging instrument incorporating the mirrors 20, 22 becomes independent of the L/D ratio and only depends on the resolution of the optics. A mirror-based neutron imaging setup is shown schematically in FIG. 2. It is clear from this figure that a much larger fraction of the neutrons emitted by the source 12 will contribute to the image.

Figure 3:
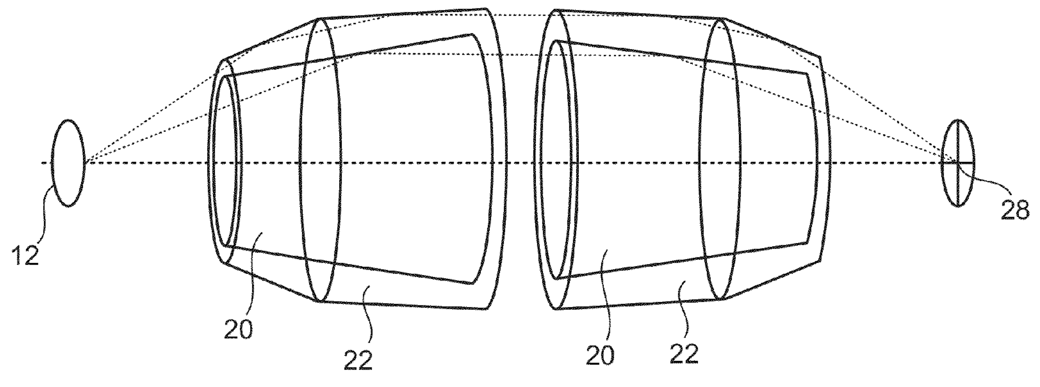
FIG. 3 is an illustration of a set of nested, axisymmetric mirror layers of this disclosure.

This configuration of axisymmetric mirrors 20, 22 can, accordingly, be used as an image-forming lens to substantially increase flux and, ultimately, the instrument resolution of thermal-neutron imaging. Neutron flux is improved by increasing both the effective source 12 area, as well as the collected solid angle. This method is particularly valuable for commercial use with compact neutron sources, where flux can be increased by placing the object 16 close to the moderator surface, which emits neutrons into a wide solid angle. Nested co-axial mirror assemblies providing two or more reflections are very attractive because a larger solid angle can be collected with multiple-reflection systems Two-reflection mirrors 22 (such as a confocal ellipsoid-hyperboloid pair 32, 34) can be placed inside four-reflection mirrors (such as an ellipsoid followed by three hyperboloids). The use of an even number of reflections minimizes optical aberrations (e.g., for neutron imaging, providing nearly the same time of flight for all neutrons from the object 16 to focus). The maximum possible collection efficiency grows as $(2N+1)^2$, where N is the number of reflections, but actual reflectivity values and available beam divergence will determine the optimal number for a given source 12. An example of a system containing two coaxial nested mirror layers 20, 22 (with two discrete mirrors in each layer), respectively producing two and four reflections to converge emitted neutrons to a focal point 28, is shown schematically in FIG. 3. In contrast, other multiple-reflection optical devices, such as neutron guides or whisper galleries are not imaging devices since they do not control the number of reflections.

Figure 4:
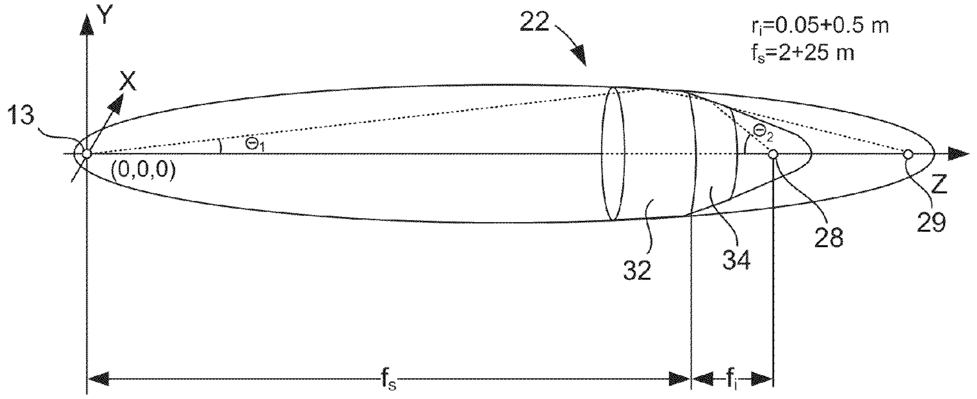
FIG. 4 is a schematic view of a pair of Wolter focusing mirrors consisting of co-focal ellipsoid and hyperboloid.

FIG. 4 shows the geometry of a pair of Wolter type-I focusing mirror sections 32, 34, including co-focal ellipsoid 32 and hyperboloid 34 inner surfaces. Incident rays reflect from both mirror sections 32, 34 before coming to a focus 28. Because only double-reflected rays make it to the focal plane, the rays that do not intersect the first mirror section 32 are stopped by a beam stop in front of the mirror 22.

The small (point) source 12 is at the origin, coincident with the left focal point of the ellipsoid. The right focus 28 (image) coincides with the left focal point of the hyperboloid. The right focal points 29 of the ellipsoid and hyperboloid are coincident. The beam and optical axes coincide with OZ axis. The distance, $f_s$, is that between the source 12 and the intersection 40 of the mirror sections 32, 34. The radius, $r_i$, at the mirror intersection 40 and the length of each mirror section 32/34 are input parameters. The distance between the intersection 40 and the image is $f_i$, while $\theta_1$ and $\theta_2$ are the angles between incident and reflected rays and the optical axis, OZ.

Figure 5:
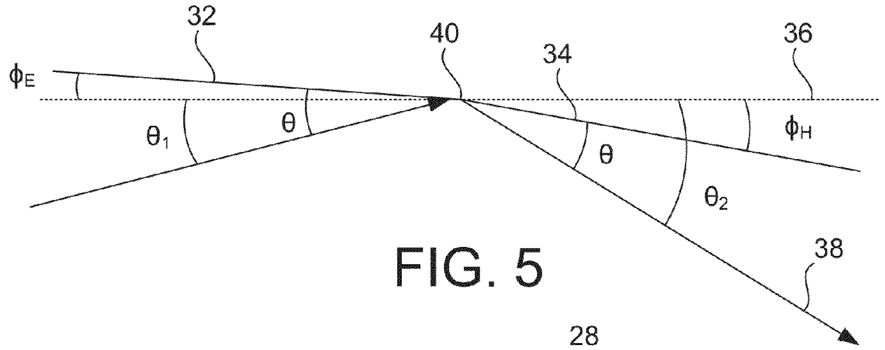
FIG. 5 is a schematic drawing of a cross-section of the mirrors (and rays) near the intersection of the ellipsoid and hyperboloid sections.

FIG. 5 shows the geometry of the mirror sections 32, 34; optical axis 36; and a neutron ray 38 close to the intersection point 40. The angles, $\theta_1$ and $\theta_2$, are between the rays and the optical axis; θ is between the rays and the mirror sections 32, 34; and $\phi_E$ and $\phi_H$ are between the tangent of the mirror sections 32, 34 at the intersection point 40 and the optical axis 36. The conditions for the angles in FIGS. 4 and 5 are as follows (when incident angles, θ, are equal):

$$\tan\theta_1=r_i/f_s,\ \tan\theta_2=r_i/f_i; \tag{1}$$

$$\phi_E=(\theta_2-3\theta_1)/4,\ \phi_H=(3\theta_2-\theta_1)/4; \text{ and} \tag{2}$$

$$\theta 32\ \theta_1+\phi_E=\theta_2-\phi_H. \tag{3}$$

The ellipsoid and hyperboloid are defined respectively by the equations:

$$r_E=b_E\sqrt{1-(z-z_{DE})^2/a_E^2},\ r_H=b_H\sqrt{(z-z_{OH})^2/a_H^2-1}. \tag{4}$$

Here, z is the coordinate along the optical (beam propagation) axis; x and y are perpendicular to z; and $r^2=x^2+y^2$. The parameters, a and b, denote the semi-major and semi-minor axes of the ellipsoid and hyperboloid, while $z_o$ denotes the location of their centers. From the initial parameters and the confocality condition for the hyperboloid and ellipsoid mirror sections 32, 34, it follows for $z_{OH}$ and $z_{OE}$:

$$z_{0H}=c_E,\ z_{0H}=2c_E-c_H=0.5(f_s+f_i)+z_{0E},\ c_H=\frac{f_i\theta}{r_i/f_i-2\theta}. \tag{5}$$

Parameters, a and b, are found using the definitions for ellipsoid and hyperboloid: $a_E^2-b_E^2=C_E^2$ and $a_H^2+b_H^2=C_H^2$ and by using the equations for ellipsoid and hyperboloid at the intersection point, $r_E=r_H=r_i$. The intersection radius increases with θ. Therefore, mirrors made of high-critical-angle material can be nested around low-critical-angle mirrors. For example, both $^{58}$Ni and neutron supermirror multilayer coatings have larger critical angles than that of naturally occurring Ni for the same energies. Hence, $^{58}$Ni and multilayer coated mirrors can be nested around a small Ni mirror. Alternatively, mirrors with the same critical angle can be nested too.

The axisymmetric mirrors 20, 22 can be formed by an electroformed nickel replication process, as described in B. D. Ramsey, "Replicated Nickel for Optics for the Hard X-Ray Region," 20 Exp. Astron 85-92 (2005). Pure nickel or nickel-alloy mirrors are electroformed onto a figured and superpolished nickel-plated aluminium axisymmetric mandrel from which they are later released by differential thermal contraction. The resulting axisymmetric mirror has a monolithic structure that contains one or more segments in accordance with the chosen geometry. The focusing optics can then be constructed from several separate mirrors, each from its own mandrel. The replicated optics technique, developed for hard x-ray telescopes, is an excellent match for neutron applications. Since nickel is the material with the highest critical angles for neutrons, the electroform nickel optics can be used to focus neutron beams.

Figure 6:
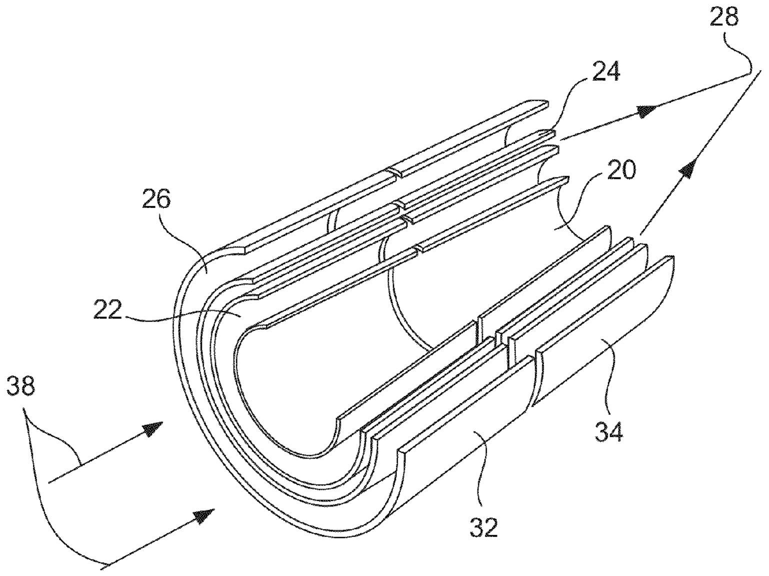
FIG. 6 is a perspective, cut-away view of neutron focusing a set of four nested mirrors, each with ellipsoid and hyperboloid sections.

An illustration of an embodiment with four axisymmetric mirrors 20, 22, 24, 26 for focusing neutrons toward a focus 28 is provided as FIG. 6. Each nested mirror includes a hyperboloidal foil 34 at the end toward the focus and a paraboloidal foil 35 at the end toward the neutron source 12.

Figure 7:
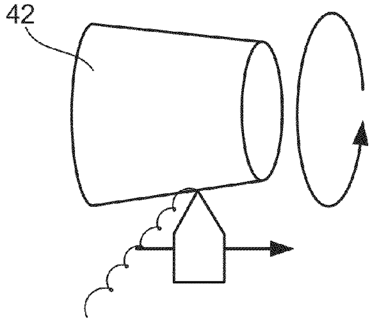
FIGS. 7-15 provide schematic illustrations of steps in a method for fabricating the mirror sections.
Figure 8:
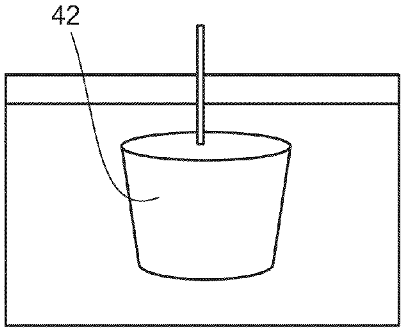
Figure 9:
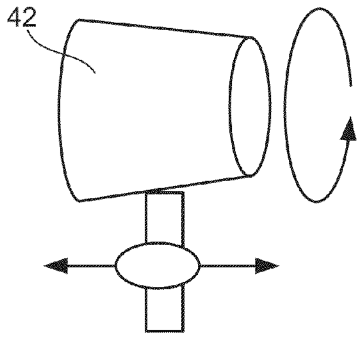
Figure 10:
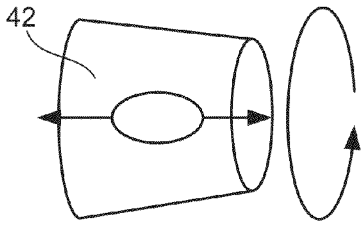
Figure 11:
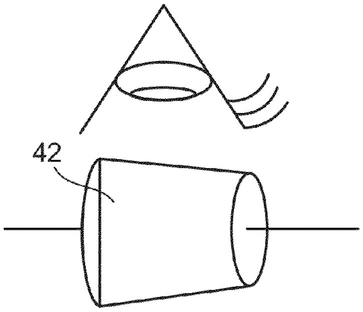
Figure 12:
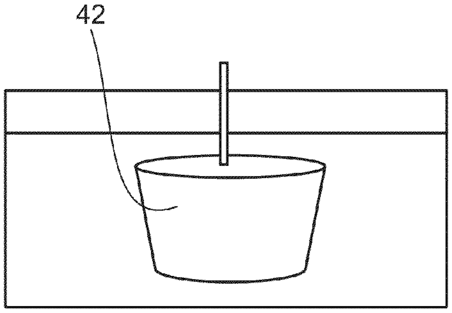
Figure 13:
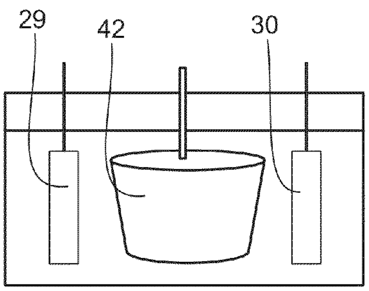
Figure 14:
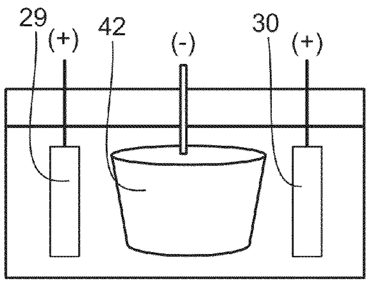
Figure 15:
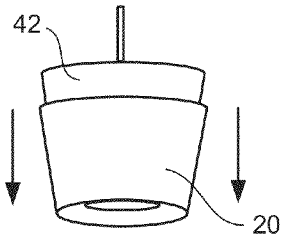

A schematic illustration of a fabrication process for the mirrors is provided in FIGS. 7-15. First, a mandrel 42 is shaped from an aluminum bar by a computer-numerical-control (CNC) machine, as shown in FIG. 7. The resulting mandrel 42 is subject to a chemical clean and activation and coated with an electroless nickel plate, as shown in FIG. 8. Precision diamond turning is then used to machine the mandrel 42 to 20 Å, ⅓ µm figure accuracy, as shown in FIG. 9. The mandrel 42 is then polished and superpolished to a 3-4 Å root mean squared (RMS) finish, as shown in FIG. 10. The mandrel 42 is then subject to metrology, as shown in FIG. 11. Next, the mandrel 42 is subject to ultrasonic cleaning and passivation to remove surface contaminants and provide a surface for the separable replicated neutron mirror, as shown in FIG. 12. Multilayers are then deposited on the mandrel 42, as shown in FIG. 13; and a nickel/cobalt (Ni/Co) shell is electroformed on the mandrel 42 using electrodes 29, 30 and solution, as shown in FIG. 14. Finally, the optic mirror 20 is separated from the mandrel 42 in a cold-water bath, as shown in FIG. 15.

In some cases, the inside (reflecting) surface of the Ni shell is coated with supermirrors or $^{58}$Ni, one of the Ni isotopes with slightly larger critical angle. The coating is applied on mandrel 42 before Ni electroplating. Then, the Ni mirror and the coating are separated from the mandrel 42.

In particular embodiments, the mirrors can fabricated using replication processes that either can generate a full axisymmetric shell directly or can generate segments that can then be assembled to form a complete optical element in the form of a segmented shell. The mirrors are made either from material (such as nickel) with high neutron reflectivity or from a material appropriate for the particular replication process that can then be coated with a high-neutron-reflectivity material or a multilayer coating to improve the neutron reflectivity and to increase the mirror acceptance angle. The mirror coating can be a single material or can include multilayers of different materials designed to increase the field of view of the mirror or to extend the neutron wavelength range. The multilayer coating on the mirror can be also used as a monochromater. The coatings do not have to be applied inside the axisymmetric mirrors, but can be applied to the mandrel 42 before the shell is electroformed.

For example, electroformed-nickel-replication can be used to fabricate full-shell nickel or nickel-alloy mirrors. Specifically, nickel or nickel-alloy shells can be electroformed onto a figured and super-polished nickel-plated aluminum axisymmetric mandrel 42 from which they are later released by differential thermal contraction (e.g., where the mandrel 42 contracts more than the electroformed shell 20 when cooled). The additional use of highly-reflective single or multilayer coatings on these nickel mirrors will extend their use from cold, through thermal to epithermal neutron energies.

Although the mirror can be fabricated by the use of the electroformed nickel process utilizing the direct current approach, better neutron-optics performance can be achieved by the use of periodically reversed pulsed plating. In this process, application of alternating cathodic and anodic current in the plating process is combined with an electrochemical etching process. In particular embodiments, the current can be controlled with a rapidly changing amplifier, such as a non-filtered bipolar operational amplifier or a specially built pulsed plating power supply, in order to switch the rectangular waveform current from about three times anodic to cathodic values with a pulse anodic of 2 to 20 milliseconds and a cathodic pulse of 50 to 300 milliseconds and a slope of minimum time. The cathodic and anodic current density can be, e.g., about from 5 to 30 milliamps per square centimeter; and the anodic pulse can be, e.g., about from 15 to 90 milliamps per square centimeter. In other embodiments, with the bipolar operational amplifier (BOP), other waveforms apart from rectangular or square can be utilized, and frequencies and amplitudes of a wider range can be utilized to form the low-stress deposit without the use of additives in the plating, which would alter the reflectivity of the mirror so manufactured. Other alloys or metals can be plated with appropriately selected waveforms in order to achieve the low stress in the deposited mirror.

An advantage of this process is that the atoms plated at non-ideal places of the material lattice have a lower bond energy and, hence, are etched away first in the following cycle. The frequency of the plating and etching processes can be balanced to fabricate the mirror material with much lower mechanical and intrinsic stress compared to material fabricated with a traditional electroforming technique. This permits mirrors of various sizes to be plated with extremely accurate dimensional tolerances.

If the material of the neutron mirror is nickel or a nickel alloy fabricated with the traditional direct-current electroforming process, the mirror material tends to have residual stress. That leads to mirror distortions and, hence, to lower mirror's optical performance. This problem can be overcome by electroforming with the periodically reversed pulsed-plating process. In this process, nickel/nickel-alloy deposition is followed by a brief reversed current electrochemical etching providing a less-stressed material in the electroformed neutron mirror. This pulsed-plating process has been shown to provide a very accurate electroformed component with essentially no stress-induced distortion.

The use of axisymmetric focusing mirrors 20, 22 makes it possible to install a high-resolution neutron imaging system in a laboratory-size shielded room at industrial production facilities or R&D centers that do not have a research reactor. Existing neutron-generator-based imaging facilities can probably be retrofitted with these mirrors to improve their performance.

The same or similar optics can also be used to conduct small-angle neutron-scattering measurements, a very popular neutron technique for materials testing, using the same neutron source 12 and detector 18.

For absorption imaging, the nested mirrors 20, 22 can perform the same role as lenses in optical microscopes, and, therefore, can lead to dramatic improvements in the spatial resolution of imaging instruments. One embodiment is a neutron microscope equipped with the nested mirrors 20, 22, which creates a magnified image of the object 16 at the detector 18. If the nested mirrors 20, 22 are placed between the object 16 and the detector 18, the resulting image can be magnified by a factor of ten or more using current technology.

Since neutrons are only weakly absorbed in most materials, phase-contrast imaging promises substantially better image quality over absorption methods. In the phase-contrast method, variations in the index of refraction are mapped, as opposed to variations in absorption. Phase-contrast imaging involves illuminating an object by a partially-coherent neutron beam, generally obtained at a large distance after transmission through a pin-hole (Fraunhofer diffraction regime). The image is obtained when a detector is placed at a distance from the object (in contrast to absorption imaging, when the detector is right behind the object 16). The combination of a small pin-hole source and large distances results in a weak signal. The signal can improve if Wolter mirrors are placed behind the object, such that the image is focused on the detector. The phase coherence is preserved due to nearly aplanatic design of the optics. All the neutrons travel the same distance and so the relative phase is preserved if one pair of mirrors is used, and nearly preserved for a nested system.

Other potential applications for the Wolter optics, described herein, lie in inelastic scattering instruments, especially at the time-of-flight instruments where time-structure of the neutron beam is a factor. Other examples include diffraction from small samples and convergent-beam crystallography, where a converging beam on the object is created by focusing mirrors. In geometrical optics, ray paths can be reversed; therefore, good focusing devices are usually also good collimators. Such optics can be used for collimating neutron beams, especially for the time-of-flight (TOF) instruments where preserving the time structure of the neutron pulse is important. Additional applications for the mirrors include the following: portable or table-top neutron sources equipped with the grazing incidence reflective optics, which can be used in industrial facilities for non-destructive testing of products; neutron beams shaped by these mirrors can be used in imaging for batteries, fuel cell, bio-medical and water-distribution applications, where the optics may increase the spatial resolution and contrast of images; concentrated (convergent) neutron beams produced by the optics can be used to improve neutron micro-probe techniques for material analysis; and parallel neutron beams produced by the optics can allow remote probing of geological regolith to search for light element resources, such as oil and water.

In each of the applications outlined, above, the mirrors can be coated with high-critical-angle multilayer coatings obtained by thin-film deposition techniques, as done for x-ray supermirrors, as described in S Romaine, et al., "Mandrel replication for hard x-ray optics using titanium nitride," Proceedings of SPIE. 7437 (2009) 74370Y. Surface figure accuracy and roughness determine the angular resolution of grazing incidence optics. Good surface quality (roughness of 2 to 4 Å (rms)) is readily achievable for mirrors prepared by the replication technique. The angular resolution of one mirror pair is of 10 arc-seconds half power diameter (HPD), while nested systems are of 15 to 30 arc-seconds HPD. Therefore, the surface quality of our Wolter optics is at least similar, if not better, than that of modern neutron guides. Specific requirements for the surface quality depend on applications. For instance, small-angle neutron scattering (SANS) requires low diffuse scattering from surface roughness, which is comparable to that of commercial neutron guides, while imaging requires small figure errors to achieve high resolution. A point source 12 imaged by mirrors of 30 arc-seconds angular resolution and of 10 m focus-to-focus length will be of 0.2 mm HPD, while the image is magnified several fold. Therefore, existing mirrors should be more than adequate for neutron imaging tasks, where detector resolution is of 0.1 mm.

In addition to those discussed, above, there are at least several neutron techniques that may benefit from the axisymmetric mirrors, especially in compact neutron sources. The following is a discussion of the use of such optics for small-angle neutron scattering (SANS), imaging, and for collecting maximum possible flux on small samples for diffraction or inelastic scattering.

A) Small-Angle Neutron Scattering (SANS)

SANS has a long history of utilizing focusing optics, such as refracting lenses or collimators, in order to increase the flux on the object, to improve the resolution and to extend the range of accessible scattering angles. Usually, the focal planes of the optics are at the entrance pin-hole and the detector; and the object is placed directly downstream of the optics. Even a small amount of focusing improves the resolution of SANS instruments. However, existing focusing devices for SANS have strong limitations in terms of their performance, especially at accelerator-based neutron sources, which rely on time-of-flight SANS. The biggest problem with refractive lenses is strong chromatic aberration; the focal distance of biconcave neutron lens changes as the second power of the neutron wavelength, $f=\pi r/(\rho b_c\lambda^2)$. Consequently, the lenses are not well-suited for time-of-flight SANS instruments, which use polychromatic neutron beam. In fact, chromatic aberrations reduce the resolution even on reactor-based SANS instruments since the beam is not perfectly monochromatic. Recent developments of magnetic lenses have shown a promise of reducing chromatic aberrations by modulating the magnetic field. However, magnetic lenses are complicated devices, which require constant support while in operation. The need for polarized neutrons further reduces the count rate.

In contrary to refractive optics, mirrors are free of chromatic aberrations. A mirror-based SANS instrument is installed at FRM-II in Munich. However, the instrument, which uses a single Cu-coated toroidal mirror, requires large samples to collect enough signal. Wolter-type optics discussed here have significant advantages over such toroidal mirrors; for example, nested mirrors having a full figure of revolution can collect larger neutron flux on the object 16, and they offer a flexibility in the optical design that allows one to make mirrors suitable for various goals, such as to enhance the flux or to shorten the length of a SANS instrument.

Figure 16:
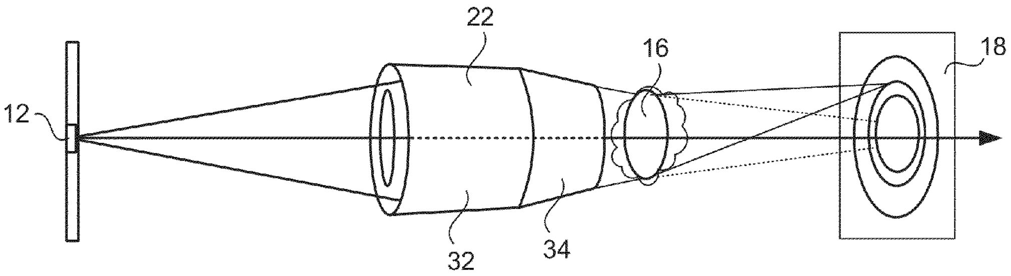
FIGS. 16 and 17 illustrate SANS using focusing mirrors with adjustable resolution; the configuration of FIG. 16 offers higher resolution and lower flux density, while the configuration of FIG. 17 offers lower resolution and higher flux density.
Figure 17:
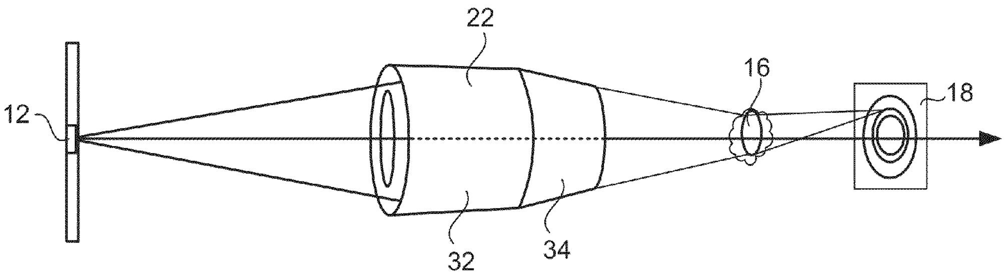

Illustrations of adjustable-resolution SANS with focusing mirrors 20, 22 are provided in FIGS. 16 and 17, where the neutrons pass through an aperture acting as the source 12 and then through the nested Wolters mirrors 20, 22 before passing through the object 16 and reaching the detector 18. The embodiment of FIG. 16 provides higher resolution and lower flux density on the object 16, while the embodiment of FIG. 17 provides lower resolution and higher flux density on the object 16.

Figure 18:
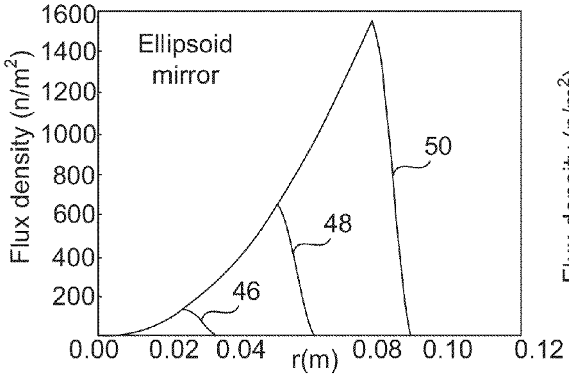
FIGS. 18 and 19 plot ray-tracing calculations of an 8-m-long SANS instrument equipped with Wolter mirrors.
Figure 19:
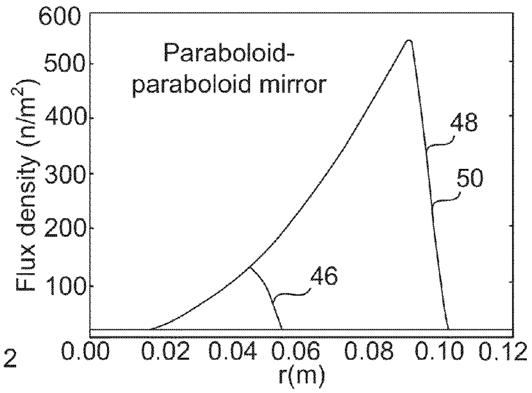

Ray-tracing calculations of an 8-m-long SANS instrument equipped with Wolter mirrors are provided in FIGS. 18 and 19. The flux density at the focal spot is equal to that of the source 12. The graphs show flux densities at the focus of the ellipsoid (FIG. 18) and at the focus of the paraboloid-paraboloid (FIG. 19) mirrors as a function of the mirror's radius. The different plots represent different supermirror coatings [m=1 (46), 2 (48) and 3 (50)].

In reference to the supermirror, the critical angle of the supermirror is m times that of natural Ni. The supermirrors are thin reflective coatings, made normally of Ni and Ti layers (e.g., tens or hundreds of bi-layers of varied thickness); alternatively, NiC/Ti can be used instead of Ni/Ti, and other supermirrors combinations can be used, as well. Supermirrors are engineered such that their critical reflection angle is larger than that of Ni by the multiplicative factor, m (normally between 2 and 7). Increasing the critical angle by using supermirrors can increase the collection efficiency of the mirrors, either by reflecting higher-energy neutrons in the polychromatic beam or by allowing larger-diameter mirrors.

In this particular case, there is no difference in performance of the paraboloid mirror sections 35 with m=2 (48) and 3 (50). The magnification, M, is 1; the total mirror length is 0.4 m; the source-to-focus distance is 8 m; and the wavelength is 4 Å. The horizontal line in FIG. 19 shows the flux density (corresponding to 16 n/m$^2$) without the mirrors. The source 12 divergence corresponds to that of an m=3.5 guide.

The simulations show that even a single short ellipsoid mirror made of Ni can improve the signal by an order of magnitude. It is possible to achieve very significant gains in the signal by nesting mirrors of different geometries and supermirror coatings. In addition to achieving higher flux at the detector, the mirrors can help decreasing the minimum q-vector or the length of the SANS instrument. The design of the optics for a real SANS instrument can take into account the achievable divergence of the beam, and the wavelength spectrum of the real source. It is clear that using axisymmetric optics at SANS instruments on compact sources may result in significant improvements of the instrumental capabilities.

b) Neutron Imaging

Neutron imaging is one of the fastest-developing neutron methods. Two key challenges for neutron imaging are weak source brilliance and poor detector spatial resolution. These challenges can be addressed by using lenses, as in optical microscopes (see FIG. 20). We demonstrated this approach experimentally, as described below. The use of axisymmetric focusing mirrors 20, 22 may lead to dramatic improvements in the spatial resolution of neutron imaging instruments. Currently, the resolution is limited by the collimation of the beam (L/D ratio) and the detector pixel size. The angular resolution of Wolter mirrors 20, 22 can reach 0.1 mrad, corresponding to L/D=$10^4$. By using the mirrors 20, 22, the size of the neutron source 12 can be made much larger than that in the pin-hole geometry, thus increasing the signal without negatively affecting the spatial resolution. In addition, if the images are magnified, the detector-pixel-size limitation is relaxed.

Figure 21:
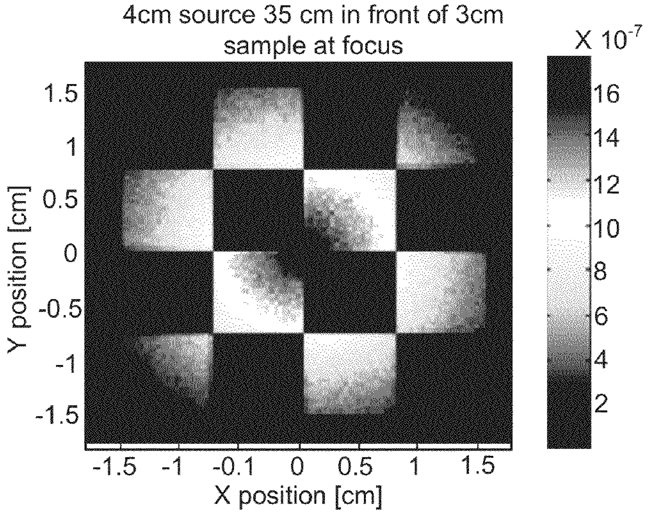
FIGS. 21 and 23 show the output of a ray-tracing simulation through a test pattern made of squares of absorbing material and squares of transparent material performed with a neutron microscope equipped with Wolter-type optics and four nested mirrors.
Figure 22:
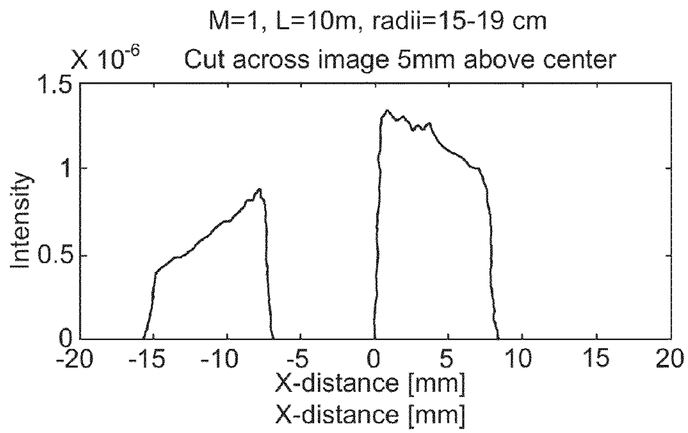
FIGS. 22 and 24 provide intensity plots across the images of FIGS. 21 and 23, respectively.
Figure 23:
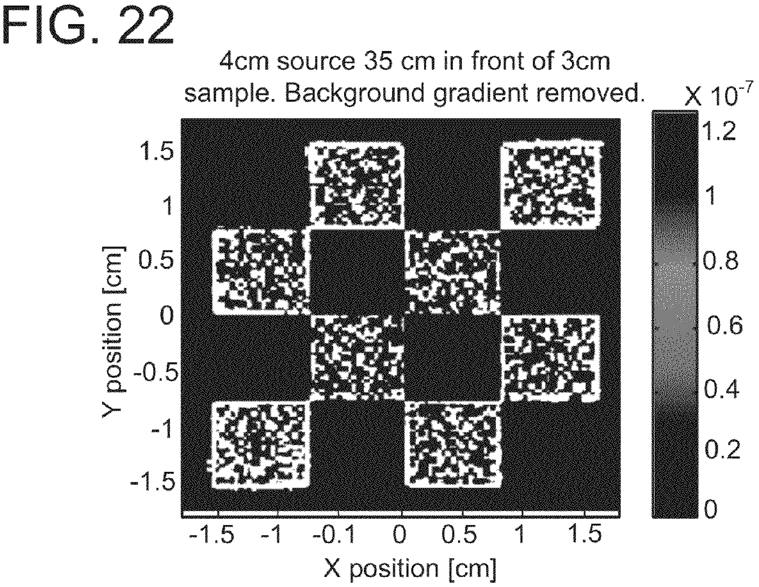
Figure 24:
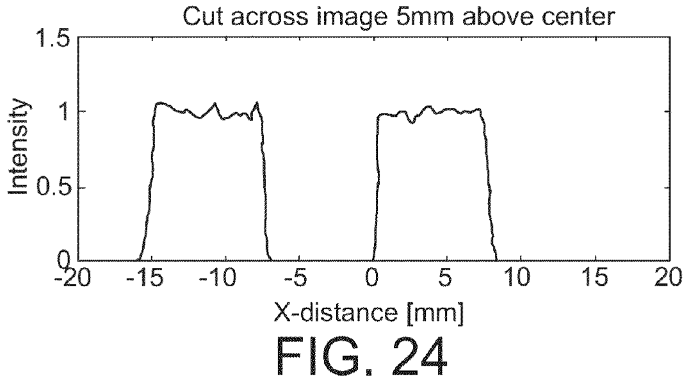

Ray-tracing simulations were performed with a neutron microscope equipped with Wolter-type optics. In this example, a test pattern made of squares of absorbing material and 0.75×0.75 cm$^2$ squares of transparent material, and a 4-cm-diamter source 12 was located 35 cm in front of the object 16. The source-to-image distance was 10 m. The optics consisted of four nested mirrors 20, 22, 24, 26 (as shown in FIG. 6) with magnification, M=1, and radii of 15-19 cm, with a m=3 supermirror coating. The resulting image is shown in FIGS. 21 and 23, respectively, with and without the background gradient removed. Intensity plots of the resulting image across the object 16 are provided in FIGS. 22 and 24, respectively, for the images of FIGS. 21 and 23.

Practically, the magnification of such optics can vary between 1 and 10. Depending on the available flux and required spatial resolution, one can design the mirrors 20, 22 that improve the performance of existing and future imaging instruments. In one embodiment, an instrument may be equipped with several sets of mirrors with different magnifications for experiments, which require different spatial resolution or field of view.

c) Neutron Flux Collection for Studies of Small Samples

Often, neutron instruments require collecting as many neutrons as possible on a sample object 16 or some optical element. We believe that short efficient collectors made from nested axisymmetric mirrors 20, 22 may prove effective for compact neutron sources because they can efficiently condense neutron beams such that the source brilliance is preserved while trading off beam size and angle. Wolter mirrors 20, 22 can collect neutron flux density on the object 16 as much as 10 times that of the source 12. The exact design and performance of such optics depends on the properties of the source, source-to-object distance and requirements to the beam divergence on the object 16.

Exemplification:

1) Neutron-Beam Focusing and Ray-Tracing Simulation

A system of four nested ellipsoid-hyperboloid Ni mirror pairs was made and tested at the Neutron Optics Test Station at the Massachusetts Institute of Technology Nuclear Reactor. A mandrel 42 of desired geometry was coated with nickel (a nickel-cobalt alloy can alternatively be used) in an electrochemical bath. When the Ni shell 20 reached desired thickness, it was separated from the mandrel 42. Numerical parameters for each of the four mirror pairs are listed in Table 1. Each row in Table 1 corresponds to one of the four nested mirror pairs. The diameter of each mirror is such that it does not project a shadow onto a larger mirror. The optics have a magnification, M=¼; when the angles between rays and the optical axis are small (paraxial approximation in geometrical optics), angular and lateral magnifications are equal to each other (i.e., $M=\theta_2=f_i/f_g$). The origin (Z=0, r=0) is at one focus of the ellipsoid. The source 12 is at the origin, and the detector 18 is at Z=3.2 m. The focal distances are $f_i$=640 mm and $f_s$=2560 mm. The projected length of the hyperbolic section along the optical axis is $L_H$, and that of the elliptical section is $L_E$. The grazing angle for a ray from the origin to the intersection point is also reported in Table 1. Hyperbolic and elliptical shapes are given by equations (1)-(5).

TABLE 1

| $a_H$(mm) | $b_H$(mm) | $a_E$(mm) | $b_E$(mm) | $L_H$(mm) | $L_E$(mm) | $r_i$(mm) | θ(deg) |
|---|---|---|---|---|---|---|---|
| 533.2821 | 7.296319 | 2133.382 | 14.59266 | 30.00 | 31.097 | 14.298 | 0.40000 |
| 533.2827 | 7.665439 | 2133.393 | 15.33097 | 30.00 | 31.097 | 15.021 | 0.42022 |
| 533.2824 | 8.053217 | 2133.404 | 16.10662 | 30.00 | 31.097 | 15.781 | 0.44148 |
| 533.2811 | 8.460593 | 2133.415 | 16.92151 | 30.00 | 31.096 | 16.579 | 0.46381 |

The system of four nested mirrors was placed in a polychromatic thermal neutron beam. The source 12 (a 2-mm diameter cadmium aperture) and a detector 18 were positioned in two focal planes. The detector 18 was based on a standard neutron-sensitive scintillator screen (Li-doped ZnS). The light output from the screen is detected by a charge-coupled device (CCD) (from Andor Luca EMCCD). The spatial resolution of the detector 18 was calibrated by imaging a 1.2-mm pinhole in a Gd foil. By fitting the image with a Gaussian function, we found that the pixel size was (92±4) μm, full width at half maximum (FWHM). The half-power diameter (HPD) of the spot was 0.62 mm. Neutrons in the focal spot were below 5 meV (cold neutron filter). The exposure was 10 seconds, and the reactor power was 4.2 MW (maximum 6 MW).

We scanned the detector 18 along the beam axis and measured the size, HPD, of the resulting image. The HPD as a function of the distance from the nominal focal plane is plotted in depth of focus scan of FIG. 25, together with the values calculated by ray-tracing. The size of the focal spot was measured while the detector 18 was scanning across the focal plane (positive distance is upstream of the focal plane). Large dots denote experimental measurements; circles connected by the broken line are ray-tracing calculations. The half-power diameter (HPD) was measured by fitting a Gaussian to the measured cross-section of the focal spot. The errors were deduced from the fit. The solid line is the parabolic fit of the experimental data. The fitted minimum of HPD is 0.62 mm. The calculated minimum of HPD is 0.35 mm. The discrepancy between the measurements and calculations is due to the misfit between the mirrors and their holder.

Figure 27:
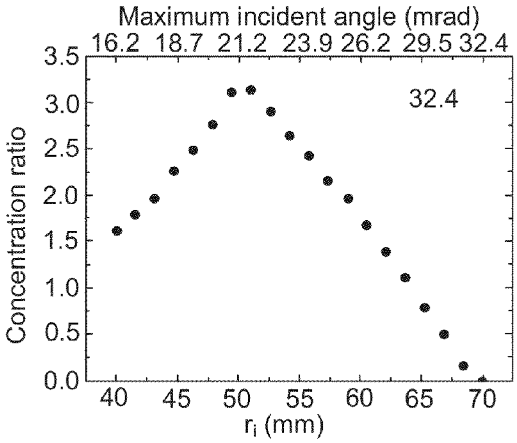
FIG. 27 provides a plot of the concentration ratio for the ray-tracing simulations showing that the neutron flux density at the focal point increases with mirror radius until the grazing angle reaches the critical value.

FIG. 27 shows the result of an angle scan when the mirrors 20, 22 were tilted with respect to the beam axis in horizontal plane. The line is a parabolic fit to the data. Imaging with the detector 18 at different distances from the focus (toward the mirror optics) allowed rings from the reflections from the two mirror pairs to be seen, confirming that both mirror pairs contribute to deflecting the beam towards the focal point; and ray-tracing calculations produced rings of similar size.

The mirrors 20, 22, described above, were optimized for the ease of testing and manufacturing. Since they are relatively short and made of Ni, these mirrors are not optimized for flux collection. For example, ray-tracing calculations predicted that only neutrons of up to about 5 meV are focused. These cold neutrons constitute a small fraction, about 5%, of the thermal neutron flux at the Massachusetts Institute of Technology Nuclear Reactor. A supermirror multi-layer coating will increase the upper cut-off energy and, therefore, the collection efficiency of the mirrors 20, 22. Also, longer mirrors will collect a higher portion of the neutron flux. We modeled flux collection efficiency of supermirror-coated long Wolter optics by ray-tracing simulations, as described in the next two paragraphs.

Here, we show the results of ray-tracing simulations for a large neutron facility. A standard software package, McStas (which provides Monte Carlo simulation of neutron instruments and is provided from a collaboration of DTU Physics, University of Copenhagen, Paul Scherrer Institute and Institute Laue-Langevin and is available via download at www.mcstas.org), was used for the simulations. Each mirror was included as a separate McStas component. Confocal Wolter pairs were combined into a McStas instrument, which included a neutron source 12, monitors and other necessary beam-line components. The ray-tracing algorithm used for the mirror components is similar to that used for neutron guides. McStas supplies and tracks coordinates and velocities of the neutrons, R=(x, y, z) and v=($v_x$, $v_y$, $v_z$). The neutron beam first propagates from the source 12 to the opening aperture plane of the mirrors 20, 22. Neutrons falling outside the leading edge of the mirror are discarded. Next, the position of the intersection of the neutron trajectory with the mirror is determined, $r_p$=($x_p$, $y_p$, $z_p$). Since the mirrors have finite lengths, only a fraction of trajectories intersect the mirrors. For the reflected neutrons, k'=k+2(k·n)n. Here k and k' are wave-vectors before and after the reflection and n is the normal to the mirror at $r_p$, as calculated from the mirror geometry. The reflectivity is a function of Q=k'−k exactly as for flat mirrors. Reflected neutrons receive a weight proportional to the reflectivity. (McStas uses the "weight factor" to calculate how many neutrons are transmitted through an instrument or a component; for example, if the reflectivity of a mirror is 10%, then every neutron is reflected, but assigned the weight of 0.1). Reflected neutrons, with the new momenta, k', propagate further to the entrance of the next component.

We calculated the neutron flux density collected by the optics and then optimized the system's parameters for maximum flux at the object 16. Mirrors 20, 22 with the following characteristics were used as an example: source-to-object distances of 10 and 25 m and critical angle of 21 mrad (corresponding to an m=3 supermirror multilayer coating and 5 meV neutrons). Several magnifications between 0.1 and 1 were tested. The flux was maximized by changing the mirror intersection radius, $r_i$. Considering current manufacturing constraints, the length of each mirror was limited to <10 $r_i$ and <0.7 m. We found that the maximal flux density at the object 16 was about three times that of the source 12 for one mirror pair, as shown in FIG. 27, which plots ray-tracing simulations of large supermirror-coated Wolter optics (m=3 supermirrors, E=5 meV neutrons, source-to-focus distance is 10 m, and magnification is M=0.1). The concentration ratio, the ratio of flux densities at the detector 18 and at the source 12, is calculated versus the mirror's radius. The corresponding maximum grazing angle is plotted on the top axis.

Figure 28:
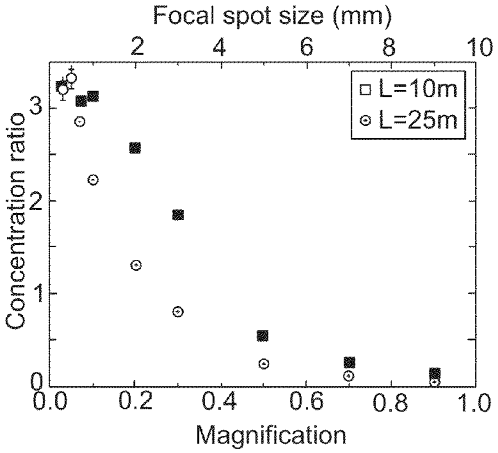
FIG. 28 plots the flux concentration ratio as a function of magnification for two different source-to-object distances in the ray-tracing simulation.
Figure 29:
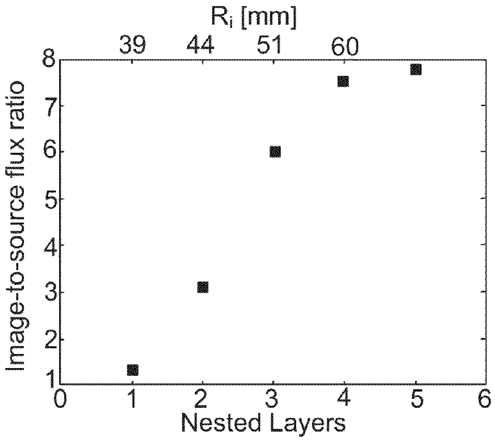
FIG. 29 plots the concentration ratio of a system of several nested Wolter mirror pairs versus the number of mirror pairs from the ray-tracing simulation.

At first, the collected flux increases with the radius, but then the flux starts to decrease. The decrease starts when some of the neutrons begin to intersect the second, hyperboloid, mirror with the angle above the critical angle. In our geometry, maximum flux is achieved at magnification 0.1 for both systems, of 10 m and 25 m, as shown in FIG. 28, which plots the flux concentration ratio as a function of magnification for two different source-to-object distances: 10 m (squares) and 25 m (dots). Calculations are for E=5 meV neutrons and m=3 supermirror multilayer coating; each mirror is 0.7 m long. The size of the focal spot, shown on the top axis, is calculated assuming the source 12 diameter is 10 mm. The effect of nesting on collection efficiency of Wolter optics in this context is shown in FIG. 29, which plots the concentration ratio of a system of several nested Wolter mirror pairs versus the number of the mirror pairs.

Increasing the number of nested mirrors leads to a significant increase in the neutron flux on the object 16. A system of four nested mirrors 20, 22, 24, 26 (as shown in FIG. 6) produces about eight times the flux density of the source 12. The flux density does not depend on the size of the source 12 for different magnifications and source 12 radius between 1 and 10 mm, according to ray-tracing simulations. The independence of flux on the source 12 size is the consequence of low aberrations for off-axis rays. The ability to change the source 12 size without affecting the performance of the optics is important for many applications, since the objects 16 often come in various sizes.

The following experimental measurements were made using small Ni mirrors, and the results are compared to calculations. In addition, extensive ray-tracing modeling was done for long m=3 supermirror-coated optics.

Figure 25:
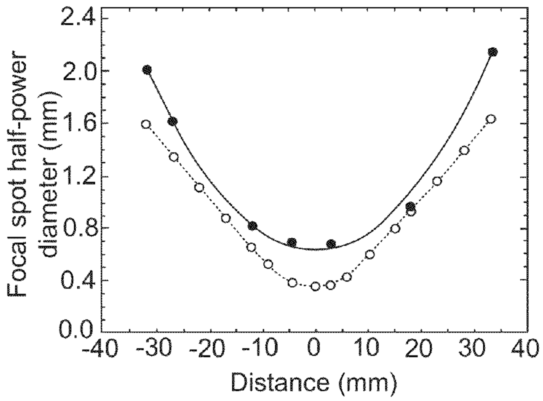
FIG. 25 is a depth-of-focus scan, showing the focal spot half-power diameter as a function of distance from the nominal focal plane, for a ray-tracing simulation using nested mirrors.
Figure 26:
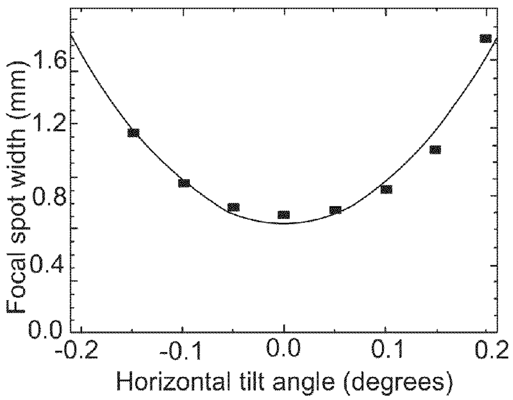
FIG. 26 shows the focal spot width with an angle scan when the mirrors were tilted with respect to the beam axis in the horizontal plane.

The experimental results shown in FIG. 25 were compared with ray-tracing simulations, using parameters from Table 1. The neutron flux is nearly constant across the 2-mm diameter source 12. Therefore, if the mirrors 20, 22 are perfectly aligned and have small manufacturing errors, we expect the focal spot 28 to be 0.5 mm diameter—four times smaller than the source 12. The corresponding HPD is 0.35 mm, as confirmed by ray-tracing simulations shown in FIG. 25. The HPD of the focal spot 28 was measured to be 0.62 mm. The mirrors 20, 22 are manufactured with small deformations (usually called figure errors), but imprecise machining of the holder resulted in unusually large figure errors during our measurements. Such deformations can be avoided by adjusting the size of the holder.

FIG. 25 shows how HPD changes with distance from the focal plane, both in experiment and simulations. By moving the detector 18 along the beam-propagation axis, we measured the depth of focus, which is the extent of the region around the image plane in which the beam is focused into a spot 28 with maximum intensity at the center. Away from the focal plane, the focal spot is transformed into rings. In the experiment, the depth of focus was about 40 mm. In the simulations, it was less than 10 mm. Both the focal spot size and the depth of focus are affected by the mechanical deformation of the mirrors caused by improper size of the mirror holder.

We measured the flux density at the focal spot position 28 with and without the mirrors 20, 22, as deduced from the intensity registered by the CCD pixels. The experimental ratio is (3±0.5), whereas the ray-tracing simulations predicted the ratio of (8±1). The discrepancy is explained by taking into account the difference in area of the focal spot. The HPD in the experiment is almost twice that in simulations (the area of the focal spot is 4 times larger); and, therefore, the density is four times smaller than predicted. An additional factor contributing to the discrepancy in flux measurements is the energy spectrum of the thermal neutron beam. Since only neutrons below 5 meV are focused, an accurate flux comparison must include the neutron beam spectrum. We modeled the neutron flux spectrum of the MIT nuclear reactor using a Maxwell-Boltzmann distribution, and we found that the flux density is practically insensitive to the details of the source 12 spectrum within our resolution. Finally, the detection efficiency of the scintillator might be energy dependent, but we believe this is not significant. We conclude, therefore, that the measurements are consistent with the ray-tracing model.

FIG. 27 shows that the neutron flux density at the focal point increases with $r_i$ until the grazing angle reaches the critical value. Therefore, larger critical angle allows larger diameter optics, which has larger collection efficiency. Consequently, for lower-energy neutrons used in many neutron applications, the flux density ratio will be larger than 10 for mirrors, such as those in our examples. Let us compare the simulation results with the fundamental limit of concentration efficiency. The theoretical limit of concentration is understood as follows. For simplicity, assume a circular source 12 at infinity subtending a semi-angle, $\theta_1$. Further assume the irradiation is concentrated onto an object 16, subtending a semi-angle $\theta_2$. In this case, the limit of the concentration ratio is $C_{max}=\sin^2\theta_2/\sin^2\theta_1=1/m^2$, where M is the magnification of the optics. If, for example, M=0.1, the maximal possible concentration, Cmax=100. Therefore, for our theoretical example shown in FIG. 29, the concentration of 8 is about 12 times smaller than the maximum possible concentration. Clearly, the losses are due to the cross-section of the mirrors in the beam. The cross-section can be increased if higher critical angles can be used, either by using longer-wavelength neutrons or multilayer coatings. Of course, the choices will be determined by the specific applications.

2) Neutron Imaging

Figure 20:
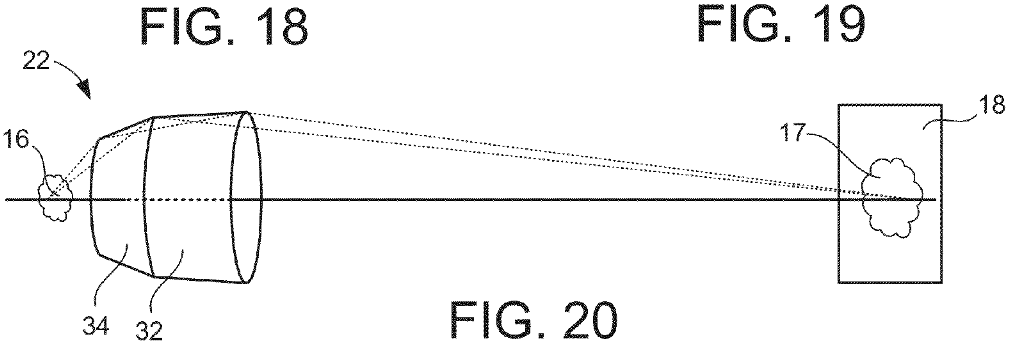
FIG. 20 is an illustration of near-aberration-free neutron imaging using a Wolter mirrors.

The imaging properties of the same mirror system were tested at the instrument development beamline at HFIR (CGI-D) at Oak Ridge National Laboratory. A schematic illustration of the neutron microscope tested in this experiment is shown in FIG. 20. As shown in FIG. 20, a single pair of Wolter mirror sections 32, 34 acted as an image-forming lens. In the microscope-like configuration shown here, the neutron beam travels from left to right. The object 16 is in the upstream focal plane of the optics. The magnified image 17 is formed at the downstream focal plane of the detector 18. The source 12 of the neutron beam is located upstream from the object 16. Only one axisymmetric mirror is shown for clarity, but several concentric co-axial mirrors 20, 22 can be used to increase the neutron flux reaching the detector 18.

In this embodiment, the mirrors 20, 22 play the role of an image-forming lens. A neutron scatterer was placed in the neutron beam to produce a source 12 with the divergence large enough to illuminate the mirrors 20, 22. The divergence of the beam at CGI-D is limited by the significant distance between the end of the guide and the beam aperture. If the source 12 was located at the end of the guide, the beam divergence would be sufficient, and no diffuser would be needed. A Gd test object 16 was placed after the scatterer in the focal plane of the optics. The mirrors 20, 22 were placed as shown in FIG. 20, such that the magnified image of a portion of the grid can be recorded. The test object 16 was translated by 3 mm, and then 20 images were collected to cover the whole length of the pattern. The analysis of the images showed that the microscope is capable of resolving a period of 0.290 mm or single lines 145 micron wide. This resolution was limited by the (binned) pixel size of the detector 18, rather than by the mirrors 20, 22. The resolution can be improved significantly if the source 12 beam had the divergence large enough to illuminate the mirrors 20, 22 without the use of the beam diffuser, which only diffuses a very small fraction of the intensity in the beam. Again, the mirrors 20, 22 were not designed for the use at CG1-0, but to demonstrate and test the feasibility of mirror-based imaging. To the best of our knowledge, this was the first experimental demonstration of neutron imaging using an axisymmetric grazing incidence microscope.

3) Increasing the Neutron Flux Concentration Using Grazing-Incidence Mirrors

Figure 30:
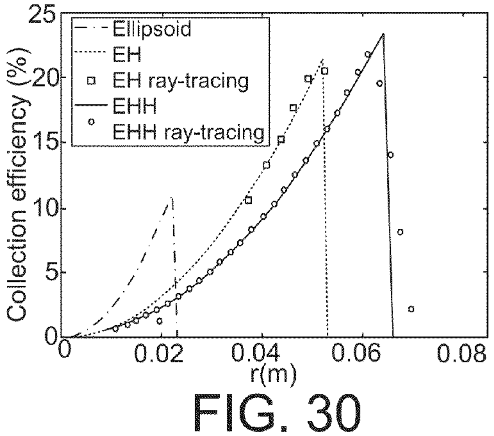
FIG. 30 plots the concentration efficiency of different types of axisymmetric mirrors versus the radii of the mirrors.

The neutron flux concentration from a neutron source 12 can be increased using grazing-incidence mirrors, by increasing the number of reflections in a controlled manner. We conducted ray-tracing simulations of various axisymmetric collectors of the neutron flux, modeling the reflectivity as a step function. Performances of different optical designs are shown in FIG. 30, where the collection efficiency is shown for ellipsoid (E), ellipsoid-hyperboloid (EH) and ellipsoid-hyperboloid-hyperboloid (EHH) mirrors as a function of their radius. The lines represent results of geometrical calculations in two dimensions. Open symbols show three-dimensional ray-tracing simulations of the optimized ellipsoid-hyperboloid (EH) design and an example of a ellipsoid-hyperboloid-hyperboloid (EHH) design ($c_{H1}$=0.45, $c_{H2}$=0.95). The radius of the ellipsoid is measured in the middle of the mirror, and the radii of the EH and EHH are measured at the intersection of the ellipsoid and hyperboloid. For all types of mirrors, magnification, M=10; total length, L=1 m; and the focal distance is 10 m. The divergence of the source 12 is constant (7.6 mrad) and equal to the angular size of the entrance aperture of the best EHH mirror. The wavelength is 4 Å and the critical angle of the mirrors is 20 mrad.

The parameters of the optics were chosen to model practical systems. The collection efficiency of each mirror increases with the radius until the critical angle is reached; after that, the performance quickly deteriorates. The maximum collection efficiency for each mirror is attained at the optimal radius. While the three-reflection mirror does not improve significantly over the two-reflection mirror, its optimal radius is larger, allowing collection of a larger beam divergence. Note that axisymmetric mirrors 20, 22 can be nested within each other to further increase the performance of the optical system. The general tendency is clear: using more reflections can be advantageous when glancing-angle mirrors are used.

Figure 31:
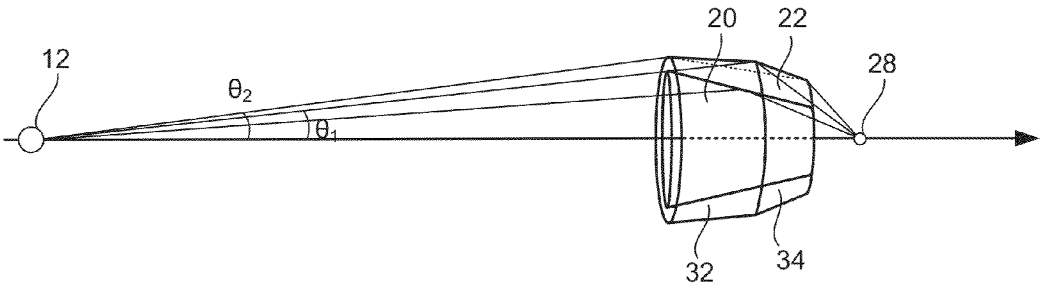
FIG. 31 is a schematic drawing of an axisymmetric concentrator that includes nested coaxial mirrors.

An example of a nested axisymmetric collector is shown in FIG. 31. Geometries analyzed in this paper correspond to the inner mirror 20, which is an ellipsoid, and the outer mirror 22, which includes confocal ellipsoid 32 and hyperboloid 34 sections. The source 12 is at the origin, while the object 16 (or any absorber) is at the second focal point. Coaxial confocal mirrors 20 of smaller radii are nested inside the largest mirror 22. The solid angle collected by each nested mirror 20, 22 is determined by the edge rays: $\Omega\sim(\sin^2\theta_2-\sin^2\theta_1)$. The values of $\theta_1$ and $\theta_2$ for the largest mirror 22 are constrained by the critical angle and attainable mirror length, while a smaller $\theta_1$ can be achieved by nesting.

Figure 32:
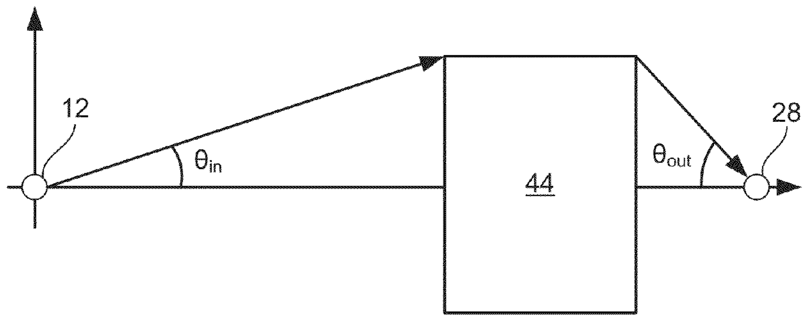
FIG. 32 is a schematic drawing of a flux concentrator using a focusing optical system.

A general flux-collecting optical system is shown schematically in FIG. 32. The "optical system" 44 can be focusing guides, axisymmetric mirrors 20, 22, or other focusing optics. For simplicity, we approximate the neutron source 12 by a near-field point source of monochromatic neutrons. Such approximation is justified in many cases given the usual sizes of neutron instruments and the fact that the flux is almost always broadly peaked at a certain wavelength. The arrows 38 illustrate an on-axis neutron or photon that emerges from the source 12 at incidence angle, $\theta_{in}$, relative to the optical axis, and reaches the object 16 at incidence angle, $\theta_{out}$.

lithe optical system forms an image, the magnification, M, is such that 0<M<1. Definitions of standard radiometric quantities and terms are repeated below. Radiance (sometimes called brilliance), $$L=\frac{d^2\phi}{\cos\theta d\Omega dA},$$

where A is the area, $$\frac{d\phi}{dA}$$

is the flux (neutrons/s/area), Ω is the solid angle, and θ is the direction with respect to the optical axis. Irradiance (at the object 16), $E=d\phi/dA_{sample}$, and radiant exitance (at the source 12), $M_e=d\phi/dA_{source}$. For a Lambert source irradiating from one side of a plane: $M_e=\pi L$. If the source 12 is constrained to irradiate into a narrow cone with the angle, $\theta_{max}$ (where $\theta_{max} \ll 1$), as is often the case with neutron instruments, $$M_e = L\pi\theta_{max}^2. \quad (1)$$

We will use the following approximation, which is often correct for neutron focusing optics and flux collectors: the source radius, a, is much smaller than the source-object separation, R. Then at the optical axis:

$$E = L\pi\phi^2, \text{ where } \phi^2 = \max[a^2/R^2, \theta_{max}^2]. \quad (2)$$

When collecting optics 20, 22 are installed between the source 12 and the object 16, the (geometric) concentration ratio, $C_G$, is calculated as follows:

$$C_G = A_{source}/A_{sample}. \quad (3)$$

Flux concentration, $C_{flux}$, and collection efficiency, $\eta$, are defined as follows:

$$C_{flux} = E/M_e,\ \eta = C_{flux}/C_G = \Phi_{sample}/\Phi_{source}. \quad (4)$$

Here, E and $M_e$ are from (1) and (2). In neutron instrumentation tests, the quantity that is usually measured is the gain, G, representing the ratio between neutron flux densities with ($E_1$) and without ($E_2$) the optics:

$$G = E_1/E_2 = \frac{E_1/M_e}{E_2/M_e}. \quad (5)$$

From (1)-(4), one can deduce the flux concentration from the measured gain in the practical case when $a^2/R^2 \leq \theta_{max}^2$:

$$C_{flux} = E_1/M_e = GE_2/M_e = G. \quad (6)$$

Note two important observations. First, the gain is very sensitive to the collimation of the beam at the source 12, $\theta_{max}$, so one must be careful when comparing optics measured using different sources. Second, the approximation (2) works when the object 16 is smaller than the source 12.

For collectors consisting of grazing-incident mirrors 20, 22, the number of reflections affects the collection efficiency of the optics. Neutrons are reflected N times from optical contours if incident angles are smaller than the critical angle, $\theta_c$. The largest output angle is obtained when neutrons attain critical angles at all contours: $\theta_{out,max} = 2N\theta_c - \theta_{in}$ (see FIG. 32). Therefore, the maximum flux concentration should increase with the number of reflections. Since, in practice, the reflectivity is less than one, the number of reflections can be limited to about three or four. Therefore, we analyzed mirrors with one, two and three reflections. We found that an ellipsoid-hyperboloid (EH) combination maximizes the collection solid angle, compared to other conic sections. Also, smaller magnification is advantageous for increasing the concentration efficiency. The magnification is limited to about one tenth by practical reasons of the optics length and total length of the system.

Figure 33:
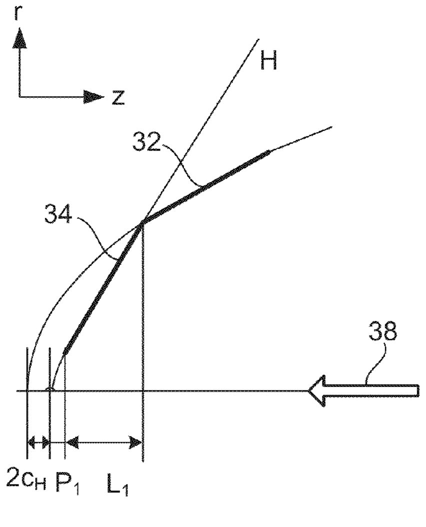
FIGS. 33 and 34, respectively, offer schematic illustrations of the layout of an ellipsoid-hyperboloid (EH) mirror and of an ellipsoid-hyperboloid-hyperboloid (EHH) mirror.

An EH mirror consists of a confocal pair of an ellipsoid and a hyperboloid (i.e., so-called Wolter type-I optics). The source 12 is placed at the focus on the ellipsoid (see FIG. 31), while the object 16 is placed at the focus of the hyperboloid (see FIGS. 33 and 34). The second focal point of the ellipsoid coincides with that of the hyperboloid. For simplicity, axisymmetric mirrors 20, 22 were first analyzed in two dimensions, followed by three-dimensional ray-tracing simulations. In the two-dimensional geometry, we sought to maximize the angle between the two edge rays, which connect the focal point with two extreme points of the first, elliptical, mirror (see FIGS. 31, 33 and 34). These geometric calculations allow for a much faster optimization than the three-dimensional ray-tracing analysis, which may be prohibitively long. We, therefore, conducted ray-tracing simulations only for the best designs.

The geometry of the system is as follows. The source 12 and object 16 are placed at the two foci, respectively. The source 12 divergence is fixed to 7.6 mrad. The position of the optics is represented by the position of the intersection of the ellipsoid (E) and hyperboloid (H). The magnification, M, is the ratio of the distances between the mirrors 20, 22 and their two foci. For this analysis, the magnification, M=0.1; and the total mirror length, L=1 m. The following four parameters determine the shape of the EH mirrors 22: $\theta_H$, $c_H$, $L_1$ and $P_1$. Here, $\theta_H$ is the angle between the reflected beam and the mirror at the end of the hyperbola; $c_H$ is the semi-focal length of the hyperbola and $L_1$ is the length of the hyperbolic mirror; $P_1$ is the distance between its end of the mirror and the focal point (see FIG. 33). The optics is designed such that all neutrons reflected by the first surface will be reflected by the successive surfaces. To optimize the mirrors 20, 22, we scanned the four-dimensional parameter space by first scanning $L_1$ and $P_1$ at constant $\theta_H$ and $c_H$. For fixed M and L, $L_1+P_1=ML/(1+M)$. In general, for a mirror of a constant length, the total number of collected neutrons increases with $L_1$ and $P_1$, until the critical incident angle is reached. After finding optimal $L_1$ and $P_1$, $\theta_H$ and $C_H$ are scanned to obtain a series of plots of intensity versus radius. The envelope of this series of plots is shown in FIG. 30 for the EH mirror. Each point on the curve for the EH mirror corresponds to different $\theta_H$, $c_H$, $L_1$ and $P_1$. The three-dimensional ray-tracing simulations are in good agreement with the simplified geometrical calculations.

Figure 34:
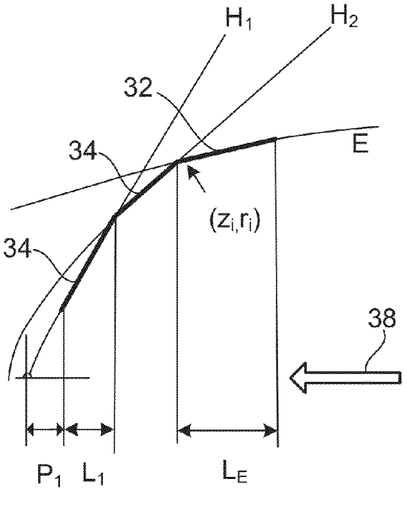

The three-reflection optic (i.e., the EHH mirror) is formed by three conic mirror sections: an ellipsoid 32 (E) followed by two hyperboloids 34 ($H_2$ and $H_1$) (see FIG. 34). The E and $H_2$ mirror sections 32, 34 share a common focus, and both hyperboloids share another common focus. In principle, the optimization of the EHH mirrors can be determined by using the algorithm similar to that used for the two-reflections EH design. The EHH mirrors have one more parameter, $c_{H1}$, the semi-focal lengths of the second hyperboloid. Hence, the optimization of an EHH mirror requires a five-dimensional space ($\theta_H$, $c_{H1}$, $c_{H2}$, $L_1$ and $P_1$). We did not perform the full optimization. To show the advantage of an EHH mirror, we constructed an example by simply fixing, $c_{H1}$, $c_{H2}$, the total mirror length, L, and the magnification, M. The radius at the E-H intersection ($r_i$) is scanned. For each $r_i$, the parameters of the ellipsoid and the $H_2$ hyperboloid are determined. By design, neutrons reflected at the upstream edge of $H_2$ are reflected by $H_1$ at the downstream end. This condition determines the geometry of $H_1$. The length of the ellipsoid (LE) was scanned to obtain the largest incident solid angle. FIG. 30 shows that the performance of even a non-optimized EHH mirror improves on that of the EH mirror. Ray-tracing simulations show that the decrease in the collection efficiency above the critical radius is less abrupt than that found by the geometrical calculations. The reason is that when the edge rays exceed the critical angle, there are still rays reflecting below the critical angle. The ray-tracing and geometrical calculations are in good agreement in the most useful region, below the critical radius. Our models did not consider losses due to scattering by roughness. We do not expect significant losses, since the reflectivity approaches 99%, but they can be taken into account when designing optics for real instruments.

The results in FIG. 30 represent a significant improvement over previous designs, outlined above. The improvements stem from relaxing a condition of equal incidence angles close to the intersection of E and H, the standard condition used in x-ray telescopes. In the preceding designs, the beam divergence was larger, 17 mrad. The angular size of such beam is much larger than the optics; therefore, the collection efficiency was smaller. The designs of this section show better performance when the same beam divergence is used for comparison.

These axisymmetric optics allow nesting of multiple confocal coaxial mirrors in order to increase the solid angle, which is intersected by the mirrors. Once the radius of each mirror has been optimized to achieve maximal collection efficiency, such as in the case of E, EH, and EHH, the mirrors can be nested inside each other. The solid angle, and thus the flux, captured by the optics is determined by the two edge rays reflecting from the first mirror (see FIG. 31). The angle between the edge rays is determined mainly by the mirror's length, which is limited by the manufacturing technology to about 1 m. When confocal coaxial mirrors 20, 22 are nested together, the solid angle, and thus the collection efficiency, can increase significantly. The collection efficiency of the nested system is the sum of all mirrors, provided inner mirrors 20 do not block rays that are collected by outer ones 22. Since the optimal radius increases with increasing the number of reflections, nesting of one-, two-, and three-reflection mirrors is possible. For mirrors from FIG. 30, the minimum angle for the EHH of the optimal radius is larger than the maximum angle for the optimal EH, etc. Therefore, one can nest mirrors of optimal radii. The total efficiency for a system composed of the three nested mirrors from FIG. 31 would be approximately 50%.

An important application of neutron flux collectors is in transporting the beam for tens of meters between neutron moderators (the source of thermal neutrons) and instruments. This function is performed by neutron guides, a description of which is provided in Böni, P., "New concepts for neutron instrumentation," Nuclear Instruments and Methods in Physics Research Section A: Accelerators, Spectrometers, Detectors and Associated Equipment 586(1), 1-8 (2008). While direct comparison with existing focusing neutron guides is not possible using the data in the literature, axisymmetric optics should perform comparably with such guides, while presenting an advantage of a shorter length.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. For example, some of the concepts disclosed herein can be used not just with neutrons but also with x-rays or other forms of radiation. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. An apparatus for collecting and directing neutrons via grazing-incidence reflection using nested, axisymmetric mirrors, comprising:

a neutron source; and a plurality of nested, axisymmetric mirror layers positioned to receive neutrons from the neutron source and to reflect the neutrons in a redirected path, wherein the mirror layers include at least an inner mirror layer and an outer mirror layer, wherein the inner mirror layer is configured to reflect neutrons from the neutron source that are incident on the inner mirror layer N times, wherein N is an integer, and wherein the outer mirror layer is configured to reflect neutrons that are incident on the outer mirror layer N+i times, where i is a positive integer, and wherein N and i are even numbers.

2. The apparatus of claim 1, wherein the mirrors include inner surfaces that can be characterized as a function for a section of at least one of the following shapes: a cone, an ellipsoid, a hyperboloid, a paraboloid, and a shape characterized by a higher-degree polynomial.

3. The apparatus of claim 2, wherein at least the outer mirror layer includes at least a first and a second inner surface section, where the first inner surface section can be defined by a function that is distinct from the function of the second inner surface section.

4. The apparatus of claim 3, wherein the first inner surface section is on a first mirror, and wherein the second inner surface section is on a second mirror, wherein the first and second mirrors are separated within the mirror layer.

5. The apparatus of claim 3, wherein the first inner surface section is joined with the second inner surface section to form a unitary annular mirror piece within the mirror layer.

6. The apparatus of claim 1, wherein the mirrors are configured to direct neutrons from the neutron source toward a common focal point.

7. The apparatus of claim 1, further comprising a detector, wherein the mirrors are configured to direct neutrons from the neutron source toward the detector.

8. The apparatus of claim 7, further comprising an object to be scanned placed between the neutron source and the detector in the path of the neutrons from the detector.

9. The apparatus of claim 1, wherein the mirrors have inner neutron-reflection surfaces comprising nickel.

10. The apparatus of claim 9, wherein the inner neutron-reflection surfaces have a surface roughness less than 20 angstrom root mean square.

11. The apparatus of claim 1, wherein the mirrors include a multi-layer surface coating configured to reflect neutrons with an increased critical reflection angle.

12. A method for collecting and directing neutrons, comprising:

generating a dispersed release of neutrons from a source; and reflecting a portion of the dispersed release of neutrons by surfaces of a plurality of nested, axisymmetric mirrors in at least an inner mirror layer and an outer mirror layer, wherein neutrons reflected by the inner mirror layer are incident on at least one mirror surface of the inner mirror layer N times, wherein N is an integer, and wherein neutrons reflected by the outer mirror layer are incident on a plurality of mirror surfaces of the outer mirror layer N+i times, where i is a positive integer, and wherein N and i are even numbers, to redirect the neutrons toward a target.

13. The method of claim 12, wherein the target is a focal point.

14. The method of claim 12, wherein the mirrors include inner surfaces that can be characterized as a function for a section of at least one of the following shapes: a cone, an ellipsoid, a hyperboloid, a paraboloid, and a shape characterized by a higher-degree polynomial.

15. The apparatus of claim 14, wherein at least the outer mirror layer includes at least a first and a second inner surface section, where the first surface section can be defined by a function that is distinct from the function of the second inner surface section.

16. The method of claim 12, wherein the target is a detector, the method further comprising:

passing the neutrons through or around an object; and receiving and recording the neutrons at a detector after the neutrons pass through the object and after the neutrons are reflected by the mirrors.

17. A method for forming a mirror comprising:

electroform plating a neutron-reflecting material consisting essentially of nickel on a substrate subject to an electric current; and periodically reversing the electric current to etch away a portion of the plated material that has a lower bond energy to leave a neutron-reflecting mirror with a reflecting surface formed of the remaining plated material.

18. The method of claim 17, wherein the neutron-reflecting mirror includes a multi-layer coating.

19. The method of claim 17, wherein the substrate is a mandrel, the method further comprising removing the neutron-reflecting mirror from the mandrel.

20. The method of claim 19, wherein the neutron-reflecting mirror plated on the mandrel includes an optical coating including at least one of $^{58}Ni$ and a multi-layer coating.

* * * * *

UNITED STATES PATENT AND TRADEMARK OFFICE

CERTIFICATE OF CORRECTION

PATENT NO. : 8,735,844 B1
APPLICATION NO. : 13/832778
DATED : May 27, 2014
INVENTOR(S) : Boris Khaykovich et al.

It is certified that error appears in the above-identified patent and that said Letters Patent is hereby corrected as shown below:

On the Title Page, Item (71), the list of Applicants is amended to add the following at the end of the Applicants' list:

--; and The University of Alabama in Huntsville, Huntsville, AL (US)--

Signed and Sealed this
Fifth Day of August, 2014

Michelle K. Lee

*Deputy Director of the United States Patent and Trademark Office*